(12) United States Patent
Kia et al.

(10) Patent No.: US 9,172,075 B2
(45) Date of Patent: Oct. 27, 2015

(54) BATTERY SEPARATORS WITH VARIABLE POROSITY

(75) Inventors: Hamid G. Kia, Bloomfield Hills, MI (US); Xiaosong Huang, Sterling Heights, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 938 days.

(21) Appl. No.: 12/974,269

(22) Filed: Dec. 21, 2010

(65) Prior Publication Data

US 2012/0156569 A1   Jun. 21, 2012

(51) Int. Cl.
| | |
|---|---|
| B29D 7/00 | (2006.01) |
| C08J 9/28 | (2006.01) |
| B29C 44/22 | (2006.01) |
| H01M 2/16 | (2006.01) |
| H01M 2/18 | (2006.01) |
| H01M 10/0525 | (2010.01) |
| H01M 10/0585 | (2010.01) |

(Continued)

(52) U.S. Cl.
CPC .............. *H01M 2/1653* (2013.01); *H01M 2/18* (2013.01); *H01M 10/0525* (2013.01); *H01M 10/0585* (2013.01); *H01M 4/505* (2013.01); *H01M 4/525* (2013.01); *H01M 4/587* (2013.01); *Y02E 60/122* (2013.01); *Y10T 29/49115* (2015.01)

(58) Field of Classification Search
CPC ........ H01M 2/1653; C08J 9/29; B29C 44/22; B29D 7/00
USPC .................... 429/247; 29/623.1; 264/41, 45.9
See application file for complete search history.

(56) References Cited

U.S. PATENT DOCUMENTS 3,699,038 A * 10/1972 Boom ....................... 210/500.28
3,700,525 A * 10/1972 Violette et al. ........... 156/244.25

(Continued)

FOREIGN PATENT DOCUMENTS

JP     2574952      10/1992

OTHER PUBLICATIONS

Daniel R. Baker et al.; Temperature and Current Distribution in Thin-Film Batteries; Journal of the Electrochemical Society 146(7) 2413-2424 (1999); S0013-4651(98)10-093-9CCC: $7.00 © The Electrochemical Society, Inc.

*Primary Examiner* — Ula C Ruddock
*Assistant Examiner* — Thomas Parsons
(74) *Attorney, Agent, or Firm* — Reising Ethington P.C.

(57) ABSTRACT

A porous polymer battery separator is provided that includes variable porosity along its length. Such battery separators can increase the uniformity of the current density within electrochemical battery cells that may normally experience higher current density and higher temperatures near their terminal ends than they do near their opposite ends. By disposing a variable porosity separator between the electrodes of an electrochemical cell such that its terminal end has a lower porosity than its opposite end, the transport of ions, such as lithium ions, through the separator can be more restricted in normally high current regions and less restricted in normally low current regions, thereby increasing the overall uniformity of current density within the battery cell. Variable porosity battery separators may be produced by a modified solvent exchange process. The process may include forming a polymer-containing film having a non-uniform thickness, selectively densifiying the film so that it has a non-uniform polymer concentration, and inducing variable porosity in the film.

11 Claims, 2 Drawing Sheets

(51) Int. Cl.
*H01M 4/505* (2010.01)
*H01M 4/525* (2010.01)
*H01M 4/587* (2010.01)

(56) References Cited

U.S. PATENT DOCUMENTS

| | | |
|---|---|---|
| 4,330,602 A | 5/1982 | O'Rell et al. |
| 4,721,732 A * | 1/1988 | Dubrow et al. ............... 521/62 |
| 5,277,811 A * | 1/1994 | Moya ........................ 210/500.3 |
| 5,969,080 A * | 10/1999 | Ieki et al. ..................... 528/170 |
| 7,384,988 B2 * | 6/2008 | Gauthier et al. ............... 521/64 |
| 7,399,322 B2 * | 7/2008 | Yu ................................ 29/623.5 |
| 7,439,291 B2 | 10/2008 | Wang et al. |
| 7,642,012 B2 | 1/2010 | Djian et al. |
| 2005/0170243 A1 | 8/2005 | Ozawa et al. |

* cited by examiner

BATTERY SEPARATORS WITH VARIABLE POROSITY

TECHNICAL FIELD

This disclosure pertains to separators for use between electrodes in electrochemical battery assemblies and, more specifically, to porous polymeric separators that both physically isolate opposing electrodes from one another and contain electrolyte to transport ions from one electrode to the other during battery charging and/or discharging cycles.

BACKGROUND OF THE INVENTION

Battery separators are widely used in liquid-electrolyte batteries to prevent physical contact between positive electrodes and negative electrodes within a given battery cell while simultaneously enabling ionic transport between electrodes. One type of battery separator is a porous or microporous polymeric separator. This type of separator is typically placed between the positive and negative electrodes within an electrochemical battery cell to physically isolate the electrodes from one another and to absorb liquid electrolyte into its porous structure. By being in intimate physical contact with each electrode, the separator containing the liquid electrolyte facilitates ion transport through the pores of the separator and between electrodes during the operation of the battery, either while discharging under an electrical load or while charging under an applied voltage from an external source.

Depending on the particular application for a liquid-electrolyte battery, any number of individual battery cells may be arranged in series, in parallel, or in various combinations thereof to satisfy the power requirements for the application. For example, a given battery cell is usually capable of producing a known voltage, based largely on the types of materials utilized, and has a particular current capacity, based largely on the types of materials, the size of the components such as the electrodes and the surface area of the electrodes in contact with the electrolyte. To obtain the desired voltage from a battery, a sufficient number of individual cells are connected in series; e.g., six two-volt cells may be placed in series to obtain a twelve volt battery. To obtain the desired current capacity from the battery, multiple such sets of cells may be connected in parallel or multiple sets of cells connected in parallel may be connected in series. Of course other arrangements are possible.

In batteries that utilize multiple cells electrically connected to achieve usable power levels, one way that multiple electrodes of one polarity or the other can be connected to each another is via a common electrically conductive connection located along the same edge of each electrode. For example, individual electrodes sometimes each include a tab extending from a respective edge so that the multiple tabs of each polarity can be connected to one another by welding or some other suitable process to form an electrical connection between the individual electrodes. In some battery assemblies, such tabs extend from a top edge of each electrode or from a current collector associated therewith. Such internal battery connections may also be called internal terminals.

The inventors of the subject matter disclosed herein have recognized some potential problems that may result from battery constructions that include internal terminals such as those described above and have discovered structures and methods to help mitigate the problems.

SUMMARY OF THE INVENTION

Disclosed below are methods of making separators for use in electrochemical battery cells, such as lithium-ion battery cells. Such separators are quite thin (e.g., up to about 50 μm thick) and are placed between positive and negative electrodes in battery cells in facial contact with each of the electrodes. They may be in the form of polymeric sheets or films that are complimentary in shape with the electrodes. For example, some battery electrodes are rectangular in shape, and in a complimentary fashion, the separator films are rectangular in shape as well. The separators are characterized by an open porous structure within the separator material or materials. More specifically, the separator includes a series of pores distributed throughout the sheet along its length and width, the pores being interconnected such that they connect opposite surfaces of the film through its thickness. The pores permit liquid electrolyte flow and ion conduction through the separator.

The inventors herein have recognized that separators may be formed with a variation in the pore amount, size, and/or locations so as to provide for more uniform ionic current flow across the entire area of the separators and facing electrodes. According to the structures and methods presented below, this interconnected pore structure includes pores that may vary in size, number, spacing, and distribution along the length and/or width of the separator in a controlled manner, broadly defining a variable porosity. One end of each electrode and the complimentary-shaped separator in a battery cell typically lies in close proximity to an electrical contact of each electrode, usually in the form of metallic tabs that extend from each of the electrodes. Such tabs may join and be electrically connected to tabs from other electrodes and/or battery cells to form a common terminal. The variable porosity separators described below may be oriented in the cell so that the end of the separator furthest removed from the tabs has a higher porosity and more ionic conduction than the end of the separator located nearest the tabs. This type of configuration may be prepared to bring more uniformity to an otherwise non-uniform current density along the length of the electrodes by allowing higher levels of ion transport through the separator in the higher porosity regions furthest removed from the electrode tabs.

Taking advantage of the fact that the pores in a typical separator are included to hold a liquid electrolyte and to additionally allow flow of ions through the pores via the liquid electrolyte, the present inventors have discovered previously unknown methods of controlling the flow of ions through the pores by controlling the size and distribution of the pores, along with methods to control the size and distribution of the pores so that different sizes and distributions of pores may be present within the same separator. Using the methods described below, not only can the size and distribution of pores be controlled and varied within the same separator, but the location of the different-sized pores and corresponding variations in material porosity may also be controlled within an individual separator.

The inventive methods of making variable porosity separators may generally include producing a polymer-based film having a non-uniform thickness across its width, selectively densifiying the film so that it has a non-uniform polymer concentration across its width, and inducing porosity into the film via a solvent exchange process. The preparation and configuration of the film prior to the solvent exchange process, as described in the methods below, are previously unknown techniques. The polymer-based film may be a polymer solution, including a polymer, such as a polyimide, and a polymer solvent. The film may be deposited onto a moving substrate by extrusion or other techniques in a continuous process and so that the film has a non-uniform thickness across its width, which is transverse to the direction of extrusion. A cross-section taken across the width of the film includes a first end and a second end corresponding to opposite widthwise edges of the continuously deposited film, the first end being thicker than the second end. The selective densification may include preferential evaporation of solvent from the film where evaporation is favored at the first, thicker end of the film. Selective densification may alternatively include mechanical working of the film by a process such as calendaring. The selective densifying results in a film of uniform thickness having a non-uniform polymer concentration across its width from the first to the second end, with higher polymer concentration at the first end. Then, the film is immersed in a non-solvent to remove the polymer solvent from the film, thereby precipitating a porous polymer film. Due to the non-uniform polymer concentration across the width of the film, the resulting film has a variable porosity, with the first, more dense end having lower porosity than the second, less dense end. The less densified areas of the film have larger and/or more pores for increased ionic conduction through the film in those areas in the presence of an electrolytic fluid.

Using these or other methods, an electrochemical battery cell may be produced according to a preferred embodiment. The electrochemical cell is preferably a lithium-ion cell and includes a positive electrode and a negative electrode with a porous separator assembled between the electrodes. The separator contains an electrolyte solution within its porous structure that is capable of transporting ions from one electrode to the other. The separator is preferably made using one or more polyimide and/or aromatic polymers and has a variable porosity. The porosity may vary such that the porosity and/or pore size is smaller near the portions of the separator lying near an electrode terminal and larger in separator regions spaced from or further removed from the terminal so that ionic flow through the separator during the operation of the electrochemical cell is more restricted near the terminal end than it is near the distant end. The terminal end of a typical rectangular separator and its corresponding rectangular electrodes within a cell is typically the upper end where the current density and temperature is highest within a cell. Relative restriction of the ionic flow in this region compared to the opposite or lower end of the cell causes the cell to operate with a more uniformly distributed current density and temperature profile, eliminating many of the problems associated with non-uniform current density.

Other objects and advantages of the invention will be apparent from a description of illustrative embodiments of the invention which follow in this specification. Reference is had to drawing figures which are described in the following section of this specification.

DESCRIPTION OF PREFERRED EMBODIMENTS

The following description of the embodiment(s) is merely exemplary in nature and is not intended to limit the invention, its application, or uses.

Embodiments of this invention include practices to form porous separators for use between opposing electrodes in electrochemical battery cells. Before further illustration of porous separators and the processes that may be used to form them, it may be helpful to illustrate a typical liquid-electrolyte battery environment in which the separator functions.

Figure 1:
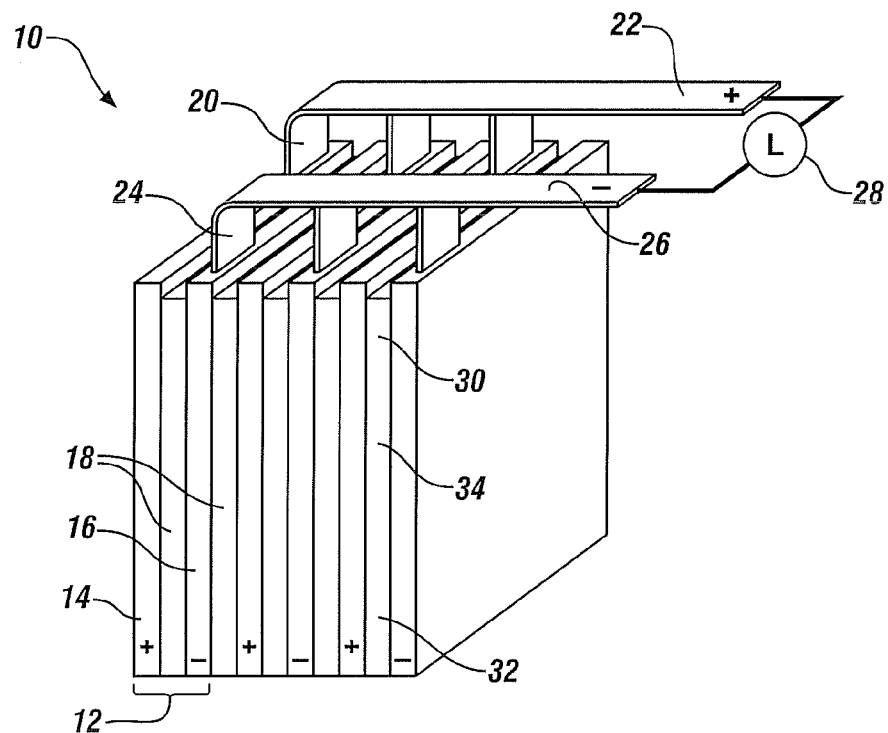
FIG. 1 is a schematic illustration of a series of electrochemical cells connected together in a parallel configuration with a positive terminal and a negative terminal connected to opposite sides of an electrical load, L.

An exemplary and schematic illustration of a typical liquid-electrolyte battery 10 is shown in FIG. 1. Battery 10 includes a plurality of adjacent electrochemical cells 12. Each cell 12 includes a positive electrode 14, a negative electrode 16, and a separator 18 disposed between the electrodes. As shown, consecutive cells share a positive or a negative electrode, 14 or 16, with one another. In this particular example, the positive electrodes 14 of each cell are electrically connected to one another via tabs 20 that extend from each electrode or from a current collector associated with each electrode. The tabs 20 meet to form a common positive terminal 22. Likewise, the negative electrodes of each cell are electrically connected via extending tabs 24, meeting to form a negative terminal 26. In this embodiment, each electrode 14, 16 is generally flat and rectangular in shape, and the tabs 20, 24 extend from the top edge of each of the electrodes. Likewise, the separator 18 is flat and rectangular in shape, complimentary to the shape of the electrodes 14, 16, together forming an overall rectangular shape for battery 10.

Alternatively, any number of separators 18 within a cell may be included as portions of a continuous sheet or film of separator material that wraps around alternating vertical edges of each electrode to assume its functional position between each pair of electrodes. For example, in a battery such as that shown in FIG. 1, a portion of a continuous sheet of separator material may be placed between a first positive and a first negative electrode; the continuous sheet may wrap around the front vertical edge of the first positive electrode, continuing to the opposite side of the first positive electrode, between the first positive electrode and a second negative electrode in the cell; the sheet may then wrap around the rear vertical edge of the second negative electrode, then continue to the opposite side of the second negative electrode, etc. until each pair of electrodes includes separator material therebetween. As used herein, this is another example of separator 18 being complimentary in shape with the shape of electrodes 14, 16 since the vertical height of the separator material corresponds to the vertical height of the electrodes, and the length of the continuous sheet of separator material corresponds to the sum of multiple electrode widths. In some embodiments, both rectangular separators having heights and widths corresponding to the heights and widths of its adjacent electrodes and continuous separator material having a height corresponding to the height of the electrodes of a given cell and a length corresponding to the multiple widths of the electrodes that it wraps around may be used together to provide a separator between each pair of electrodes.

The positive and negative terminals 22 and 26 can be connected to an electrical device 28 as shown. In this example, the terminals 22, 26 are connected to an electrical load L that places the battery 10 into a discharge state. Alternatively electrical device 28 can be an external power source that places the battery 10 into a charging state. Electrical device 28 may be any number of known electrically-powered devices, including but not limited to an electric motor for an electric or hybrid vehicle, a laptop computer, a cellular phone, or a cordless power tool, to name but a few. The electrical device 28 may alternatively be a power-generating apparatus that charges the battery 10 for purposes of storing energy. For instance, the tendency of power generating devices such as wind-powered turbines and solar panel matrices to variably and/or intermittently generate electricity often results in a need to store surplus energy for later use. In some cases, electrical device 28 can itself double as an electrical load and a power-generating apparatus, as may be the case with electric motors of hybrid or electric vehicles, where the electric motors are utilized as battery-charging generators during vehicle deceleration, for example. Of course, FIG. 1 is only a schematic illustration and is not necessarily to scale, nor is it meant to represent the physical shapes of the electrodes 14 and 16, the separators 18, the tabs 20 and 24, or the terminals 22 and 26. The electrodes and separator may assume other complimentary shapes, such as rounded shapes, and the tabs may extend from any electrode edge. In one embodiment, the battery 10 may have a cylindrical shape, for example, where continuous layers of electrodes and separators are wrapped in a coil-like configuration, forming a battery cell wrapped continuously around itself so that the electrodes and separators have a projected rectangular area when uncoiled, but are curved rather than flat when assembly into the battery.

The inventors of the subject matter herein disclosed have recognized that by locating the electrical connection for the multiple electrodes along the same edge of each electrode, as shown and described in battery 10 of FIG. 1 for example, a variable current density may result along the surface of each electrode during the operation of the battery. This is the case even when multiple cells are not utilized. For example, with a single electrochemical battery cell having a positive and negative electrode and an electrolyte disposed therebetween, an ideal location for electrical connection of the cell to an electrical load may theoretically be in the center of each electrode, because the load can draw current equally in all directions from the surface of the electrodes. By connecting electrodes to one another, to electrical loads, or to external power sources along one edge of the electrodes, the current to and from each cell may be unevenly distributed along the electrodes. For instance, where electrodes are connected to one another along their top edges in a battery assembly, as is conventional in some types of batteries, there is a shorter electrical path near the top of the electrodes through the electrolyte than there is at the bottom, leading to increased current density near the top end of the electrodes and a lower current density near the bottom.

An uneven distribution in the current density within the battery cells can have some potentially undesirable effects, such as poor utilization of the electrode materials; i.e., portions of the electrodes closer to the tabs or internal terminals experience more electrochemical activity over the life of the battery than portions that are further from the tabs or internal terminals. In some types of battery constructions, this can cause the electrodes to decay unevenly, causing the portions that experience the higher current density to decay at an accelerated rate, while portions that experience lower current density remain underused with additional life remaining in those portions after the high current density portions have decayed beyond their usefulness. Another undesirable effect of an uneven current distribution in battery electrodes is a corresponding uneven temperature distribution within the electrochemical cell, with the higher current density regions having an elevated temperature compared to lower current density regions. Elevated temperatures within a battery cell can have the effect of degrading the polymeric material of the separator, among other detrimental effects. Uneven current distribution may also result in non-uniform expansion and contraction of the solid electrode materials. For instance, conventional lithium ion cells may expand on charge and contract on discharge. Hence, a non-uniform current distribution may lead to mechanical strains and associated stresses on the cell materials that can lead to loss of contact between cell components and accelerate cell failure.

These are only a few examples of potentially undesirable effects of an uneven current density distribution within a battery cell. The effects may be amplified with larger batteries that are designed for large electrical current capacity, for example with larger automotive batteries (as compared to smaller batteries such as those used in portable electronics or the like). Larger batteries may generally have larger and/or longer electrodes, with the resulting disparity in current density from one end of the electrode plate to the other increasing with increasing electrode length or distance from the internal terminals. Temperature effects are even further amplified in larger batteries because the ratio of the mass of the battery to the surface area of the battery generally increases, making the cooling of the already thermally insulated system more difficult overall.

In a typical embodiment, separators 18 include one or more porous, microporous, or fibrous polymeric films that have a liquid electrolyte absorbed into their structure. Specific embodiments according to the teachings presented herein will be described in further detail below. But generally, separator 18 is designed to physically separate the positive and negative electrodes 14, 16 of each cell 12 from one another while simultaneously allowing ion transfer from one electrode to the other through the pores of the separator. The separator 18 facilitates such ion transfer by having its open structure filled with liquid electrolyte and by being in intimate contact with the surfaces of each of the opposing positive and negative electrodes 14, 16.

Battery 10 can additionally include a wide range of other components that, while not depicted here, are nonetheless known to skilled artisans. For instance, battery 10 may include a casing, gaskets, terminal caps, vents, fill ports, or any other desirable components or materials that may be situated between or around the positive electrodes 14, the negative electrodes 16, and/or the separators 18 for performance related or other practical purposes. Moreover, the size and shape of the battery 10 may vary depending on the particular application for which it is designed. Battery powered automobiles and hand-held consumer electronic devices, for example, are two instances where the battery 10 would most likely be designed to different size, capacity, and power-output specifications. The battery 10 may also be connected in series or parallel with other similar batteries to produce a greater voltage output and power capacity if the electrical device 28 so requires.

The exemplary battery construction depicted in FIG. 1 and described above is meant to represent any of the various types of available batteries that utilize porous separators between opposing positive and negative electrodes. Some examples of such batteries include nickel-cadmium (NiCd), nickel-metal hydride (NiMH), lithium (Li), lithium-ion (Li-ion), zinc carbon, alkaline zinc-manganese oxide (Zn—$MnO_2$), and lead-acid batteries, to name a few. While each of these and other types of batteries may advantageously utilize the porous separators disclosed herein, a preferred type of battery is a lithium-ion battery.

Lithium-ion batteries have gained favor in many applications due to their relatively high voltage or potential per cell, relatively high energy density (available power per unit mass), ability to maintain a charge while dormant for longer periods of time than other rechargeable batteries, and a reduced presence of the "memory" phenomenon that other types of rechargeable batteries may exhibit when subjected to multiple shallow-discharge and recharge cycles.

The operation of a lithium-ion battery is well-known by skilled artisans. In a lithium-ion battery, the negative electrode 16 typically comprises a lithium insertion material or alloy host material, the positive electrode 14 typically comprises a lithium-containing active material that can store lithium at higher potential (relative to a lithium metal reference electrode) than the host material of the negative electrode 16, and the liquid electrolyte contained in the porous separator is typically an electrolyte solution comprising one or more lithium salts dissolved and ionized in a non-aqueous solvent. Each of the positive and negative electrodes 14, 16 may also be carried on or connected to a metallic current collector—typically aluminum for the positive electrodes 14 and copper for the negative electrodes 16. For example, a typical positive 14 electrode may comprise a sheet of aluminum metal foil as the current collector and be coated on both sides with an electrode material comprising a layered structure of metal oxide, such as lithium cobalt oxide ($LiCoO_2$), or a material comprising a tunneled structure, such as lithium manganese oxide ($LiMn_2O_4$). A typical negative electrode may comprise a sheet of copper metal foil as the current collector and be coated on both sides with an electrode material comprising a layered material such as a graphitic carbon.

A lithium-ion battery can generate a useful electric current during battery discharge by way of reversible electrochemical reactions that occur when electrical device 28 is an electrical load L connected between the positive terminal 22 and the negative terminal 26 at a time when the negative electrodes 16 contain a sufficiently higher relative quantity of intercalated lithium. The chemical potential difference between each positive and negative electrode 14, 16—approximately 3.7 to 4.2 volts in a lithium-ion cell, depending on the exact chemical make-up of the electrodes 14, 16—drives electrons produced by the oxidation of intercalated lithium at the negative electrode 16 through the electrical load L toward the positive electrode 14. Lithium ions, which are also produced at the negative electrode, are concurrently carried by the electrolyte solution through the porous separator 18 and toward the positive electrode 14. The electrons flowing through the electrical load L and the lithium ions migrating across the porous separator 18 in the electrolyte solution eventually reconcile and form intercalated lithium at the positive electrode 14. The electric current can be directed through the electrical load L until the intercalated lithium in the negative electrode 16 is depleted and the capacity of the battery 10 is thus diminished.

Some batteries, such as lithium ion batteries, can be charged or re-powered at any time by utilizing an external power source as electrical device 28 connected to the terminals of the battery 10 to reverse the electrochemical reactions that occur during battery discharge. In a lithium-ion battery, the connection of an external power source to the battery 10 compels the otherwise non-spontaneous oxidation of intercalated lithium at the positive electrode 14 to produce electrons and lithium ions. The electrons, which flow back towards the negative electrode 16 from the external power source, and the lithium ions, which are carried by the electrolyte across the porous separator 18 back towards the negative electrode 16, reunite at the negative electrode 16 and replenish it with intercalated lithium for consumption during the next battery discharge cycle. The external power source that may be used to charge the battery 10 may vary depending on the size, construction, and particular end-use of the battery. Some exemplary external power sources include, but are not limited to, an AC wall outlet and a motor vehicle alternator. Similar charge and discharge cycles may be described for other types of batteries where other types of metal ions are transported through the porous separator 18 from one electrode to the other, as the lithium-ion construction is only exemplary.

Referring again to FIG. 1, separators 18 may comprise any of a variety of electrically insulating materials, and typically comprise one or more polymeric materials, some examples of which will be described below in conjunction with the methods that may be used to process them. As oriented in an electrochemical battery cell, separator 18 and its various components, when applicable, may include a terminal end 30, depicted near the top end of the battery of FIG. 1, and an opposite end 32, depicted near the bottom end of the battery of FIG. 1. Separators 18 may include one or more layers of different materials or materials having different properties, porosities, thicknesses, etc. to achieve the overall desired performance properties. In one embodiment, separator 18 includes a single porous separator layer 34, but other embodiments may include multiple porous separator layers 34 or one or more porous separator layers 34 combined with other types of separator layers such as fibrous layers or other types of layers. Each separator 18 or separator layer 34 may optionally including various types of performance enhancing coatings, such as ceramic coatings.

Figure 2:
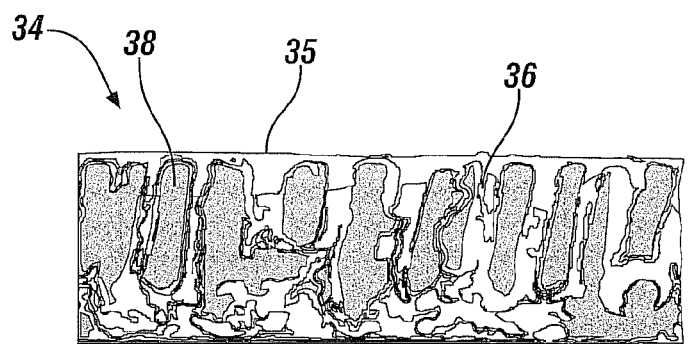
FIG. 2 is an illustration based on a micrograph of a cross-section of a film that can be used to form a porous separator for use between positive and negative electrodes of electrochemical cells such as those of FIG. 1. The cross-section shows a porous structure produced by a solvent exchange process.
Figure 3:
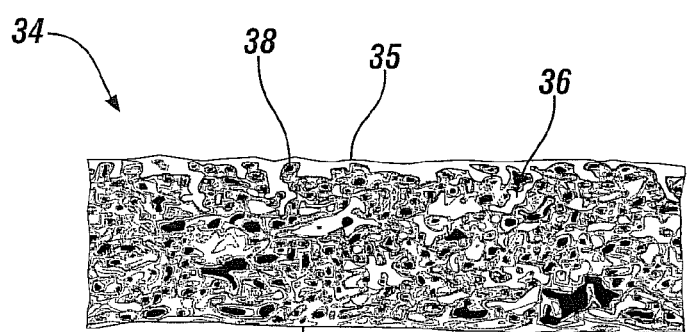
FIG. 3 is an illustration based on a micrograph of a cross-section of another film that can be used to form a porous separator for use between positive and negative electrodes of electrochemical cells such as those of FIG. 1. The cross-section shows another porous structure produced by a solvent exchange process with pre-conditioning.

Separator layer 34 may be in the form of a film or sheet and may typically have an open porous structure throughout the material, including a series of interconnected pores that connect opposite surfaces of the separator layer to one another through the thickness of the separator layer to facilitate the transfer of ions therethrough when in use and filled with electrolyte. Examples of two exemplary porous structures are depicted in FIGS. 2 and 3, which illustrate micrographs of cross-sections of exemplary films that may be used to form separator layers 34. These types of porous structures may be produced by a solvent exchange process, also known as a phase inversion process, examples of which will be described in further detail below. Generally, though, a solvent exchange process includes immersing a film of polymer solution, comprising a polymer and a polymer solvent, in a non-solvent or a mixture of polymer solvent and non-solvent. The non-solvent and the polymer solvent are miscible so that when the film is immersed, the polymer precipitates from solution to form a porous film. The term "non-solvent" as used herein includes fluids in which the polymer of the corresponding polymer-solvent system is not soluble. FIGS. 2 and 3 are provided only to show exemplary types of pore structures that may be produced using solvent exchange techniques and are not intended to illustrate variable porosity structures as will be later defined.

FIG. 2 illustrates one example of a porous structure that may be included within at least a portion of separator layer 34.

FIG. 2 is an illustration based on a microscopic view of a cross-section taken through a film formed using a solvent exchange process. The film has opposite top and bottom surfaces 35, 37 (as oriented in the figure). The porous structure includes a polymer matrix 36 (the light areas of the cross-section) and pores 38 (the dark areas of the cross-section) formed within the matrix 36. The particular porous structure shown in FIG. 2 includes generally cylindrical pores 38 that extend nearly the entire film thickness from one surface 35 of the film to an opposite surface 37 of the film. The opposite surfaces comprise polymer skin layers formed during processing. While too small to be illustrated in the figure, these skin layers are highly porous, but the pores may be approximately two orders of magnitude smaller than pores 38. The illustrated pores 38 are approximately 5 µm in diameter on average. In a plan view of this type of structure (not shown), the porous structure may be viewed as a honeycomb-like structure where the polymer matrix 36 is arranged as a series of interconnected walls that surround and define the generally cylindrical pores 38.

FIG. 3 depicts another example of a type of porous structure that may be included within at least a portion of separator layer 34 and is an illustration based on a microscopic view of a cross-section taken through a film formed using a solvent exchange process. The film has opposite top and bottom surfaces 35, 37 (as oriented in the figure), and the porous structure includes polymer matrix 36 (the light areas of the cross-section) and pores 38 (generally, the dark areas of the cross-section) formed within the matrix 36. This type of porous structure may be produced by a process that includes a pre-conditioning step prior to the solvent exchange process, examples of which will be described in further detail below. As can be seen in FIG. 3 when compared to FIG. 2, this type of porous structure generally does not include directional, aligned, or oriented features within the structure like the structure of FIG. 2 does. In this structure, the pores 38 are generally smaller than those of FIG. 2, about 1 µm, and may be generally spherical or ellipsoidal in shape to form a sponge-like structure within the film, in which the pores are interconnected throughout the film to form a more torturous path through the thickness of separator layer 34 than is typical with the structure of FIG. 2.

The illustrated porous structures are only exemplary in nature, and any number of other types of porous structures may be provided or used in accordance with the methods described herein. For example, the porous structure may be a function of several variables of the solvent exchange process, such as the selected polymer-solvent system, the selected non-solvent, the concentration or polymer-solvent ratio, the presence of fillers in the film, or the pre-conditioning conditions, to name a few.

The solvent exchange process summarily described above may typically be used to form generally uniform porous structures within a separator layer 34. A particular porous structure may be characterized by several variables, including at least its porosity and its average pore size. Porosity may be defined as the volume percentage of the material that is occupied by voids or pores. For example, typical porosities for separator layers 34 may range from 20-90%, meaning that some separator layers 34 may include one or more regions having anywhere from 10-80% of its bulk volume composed of polymer matrix 36 and 20-90% of its bulk volume composed of pores 38. More commonly, the porosity of a typical separator layer 34 produced using the above process may range from 40-70%, and most commonly will range from 50-70%. Average pore size may be defined for a portion of a separator layer 34 as the average cross-sectional dimensions of the pores 38 within matrix 36. In most applications, an average pore size of less than 1 µm may be desirable, ranging for example from 0.01 to 1.0 µm. But average pore size can range up to 5 µm in some applications. Separator layer 34 may also be characterized by a layer thickness, which is generally uniform when formed into its final usable state and dimensions. The thickness of separator layer 34 typically ranges from about 15 to 30 µm, particularly when separator 18 is composed of a single separator layer 34. Overall separator 18 thickness may range up to about 50 µm, which may include a single separator layer 34 or multiple separator layers 34 that make up the overall thickness. Separator layers 34 can have thicknesses as low as about 10 µm in some high energy density applications, but a certain amount of strength and durability of the layer may be sacrificed with lower thicknesses. One embodiment of a separator 18 includes a single separator layer 34 having a thickness ranging from about 20 to 30 µm, and preferably about 25 µm.

Figure 4:
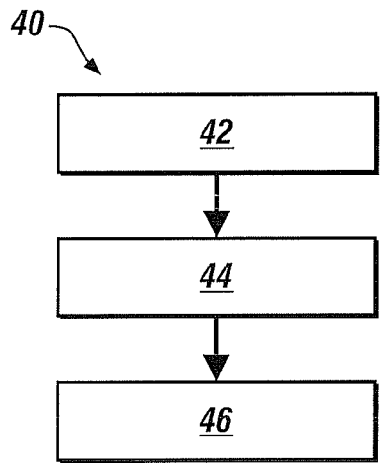
FIG. 4 is a flowchart representing some process steps that may be included in a process for producing porous separators having variable porosity.

Turning now to FIG. 4, an exemplary process 40 for producing separator layers is broadly described. More particularly, the exemplary process 40 of FIG. 4 may be used to produce separator layers having a variable porosity. The term "variable porosity" as used herein indicates that the porosity and/or the average pore size within the separator layer varies from one region of the separator layer to another. Exemplary process 40 generally includes the process steps of: forming a polymer-containing film having a non-uniform thickness (step 42); selectively densifiying the polymer-containing film to have a non-uniform polymer concentration (step 44); and inducing porosity in the film (step 46). Process 40 may be described in further detail in conjunction with the previously mentioned solvent exchange process.

In an exemplary process, step 42 generally includes forming a polymer-containing film having a non-uniform thickness. This step preferably includes an extrusion step whereby the desired separator layer polymer composition is first dissolved in a suitable polymer solvent and then extruded onto a substrate. The substrate may be a moving substrate such as a conveyor or carrier belt to move along with and support the extruded film. The substrate may be made from any of a variety of suitable materials, including polymeric materials or non-polymeric materials such as metals, ceramics, glass, etc., so long as the substrate surface is smooth so as not to substantially affect the porous structure to be introduced in subsequent steps. In some embodiments, however, the substrate may be wetted with a non-solvent prior to extruding the polymer solution thereon in order to allow selective porosity changes in the film from the underside of the film that may not have complete access to the non-solvent in subsequent steps.

Figure 5:
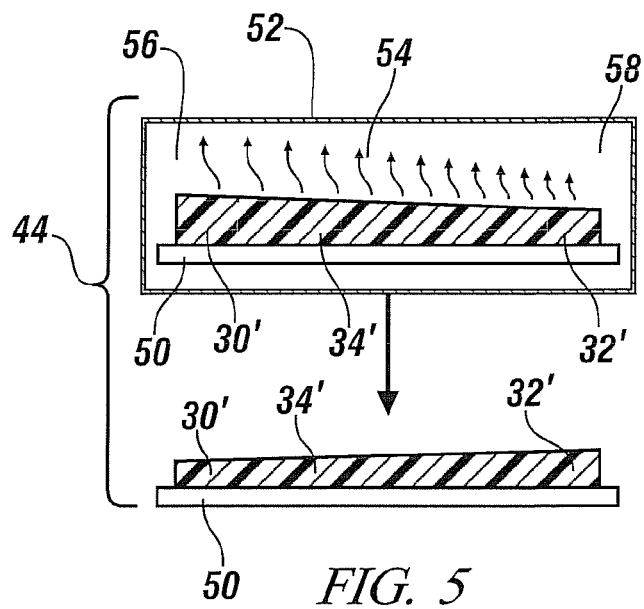
FIG. 5 is a schematic illustration of an example of the selective densifying step (46) of the process of FIG. 4, including preferentially evaporating solvent from a film having a non-uniform thickness.
Figure 6:
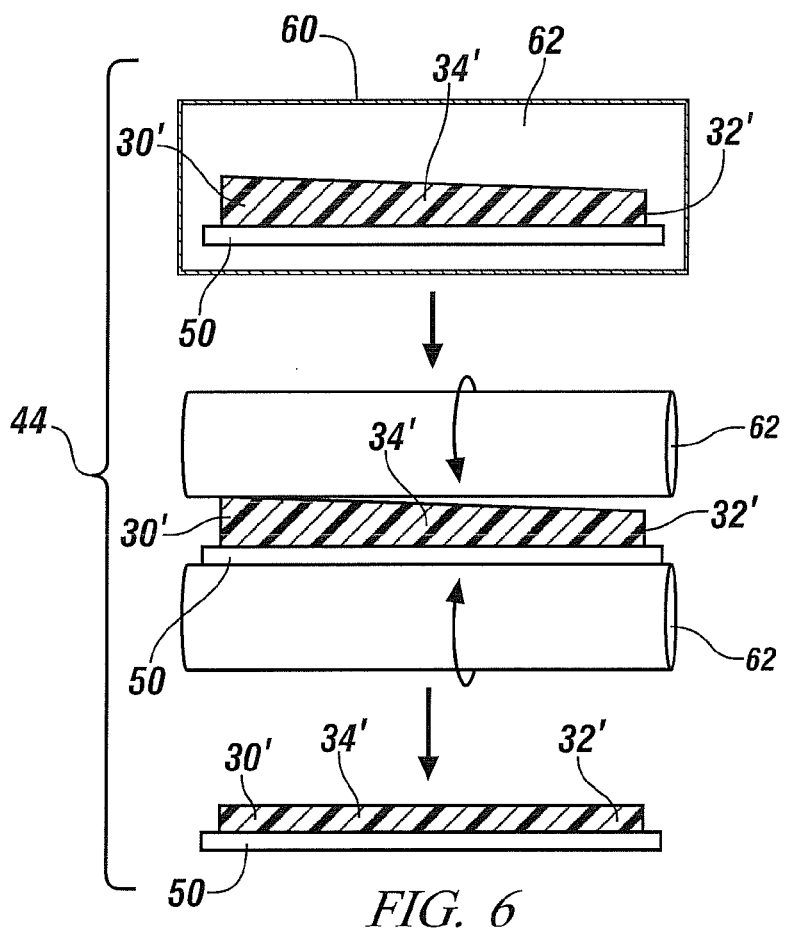
FIG. 6 is a schematic illustration of another example of the selective densifying step (46) of the process of FIG. 4, including mechanical working of a film having a non-uniform thickness.

Referring to portions of FIGS. 5 and 6, a film such as film 34' (not to scale) having a non-uniform thickness across its width may be produced via an extrusion or other deposition process. The film includes one or more polymers and one or more polymer solvents to define a polymer-solvent system. The polymer may be selected based on its final material properties and such that it is suitable as a porous material in an electrochemical battery cell. The mechanical strength, temperature resistance, and chemical compatibility of the polymer with battery electrolytic fluids are a few of the relevant properties that may be used to select a polymer.

A preferred polymer for the polymer-solvent system may be selected from the polyimide family of polymers. Aromatic polymers are another preferred type of polymers. It may also be preferable that the repeating unit of the polymer include one or more sulfur atoms, one or more nitrogen atoms, or at least one of each. Such materials may be preferred for their high strength, even when having a high level of porosity, and for their high temperature stability, to name a few advantageous properties that may be useful in liquid-electrolyte battery applications. Accordingly, a preferred polymer may be an aromatic polyimide. One example of a suitable aromatic polyimide is polyetherimide (PEI). Some other exemplary polymers that may be suitable include polyamide-imide, polysulfone, polyethersulfone, and polyamide. Other polymers may of course be selected based on any of the criteria listed above regarding polymer material properties or based on other criteria. Additionally, the polymer-solvent system may include more than one polymer or copolymers that include suitable polymers.

The polymer solvent is selected based on its ability to dissolve the selected polymer or polymers. The polymer solvent should also be miscible with the selected non-solvent to be used in the subsequent solvent exchange step. Some polymer solvents that may be included in the polymer-solvent system are dimethyl sulfoxide (DMSO), dimethylformamide (DMF), N-methylpyrrolidone (NMP), and acetonitrile. More than one polymer solvent may be included in the system so long as the polymer components are soluble in the polymer solvent mixture. The concentration of the polymer solution may range from about 5 to 40% by weight as the polymer component. In one embodiment, the polymer component is about 20 wt % of the solution. In a preferred embodiment, the polymer solution includes a polyimide dissolved in DMSO at a concentration of about 20 wt %. Of course, other polymer concentrations outside of these ranges may be used, depending on multiple variables and processing parameters such as viscosity, solvent volatility, polymer molecular weight, etc.

In some embodiments, one or more optional ceramic or other type of particulate filler, such as silica, alumina, calcium carbonate, and titanium oxide, that have particle sizes of less than 10 μm may be suspended in the polymer-containing film to help improve the mechanical and electro-chemical performance of the resulting separator layers. Where included, such filler loading can be anywhere from 1%-90% by weight.

FIGS. 5 and 6 schematically show enlarged cross-sections (not to scale) taken across the width of a long or continuous exemplary film 34' having a non-uniform thickness, according to one embodiment, that may be produced by an extrusion or other deposition process and supported by substrate 50. In cross-section, the film 34' includes first and second ends 30' and 32' along its width, corresponding to opposite widthwise edges of the extruded or deposited film. As shown, first end 30' has a thickness that is greater than that of second end 32'. The thickness of film 34' may range from about 40 to 200 μm at both of the first and second ends 30' and 32'. In one embodiment, first end 30' may be about 55 μm thick, while second end 32' may be about 50 μm thick. Stated another way, the first end 30' may have a thickness about 10% greater than the thickness of second end 32', but the difference may be as low as 5% and may also be higher than 10% depending on the desired final variation in porosity across the width of the film. Stated yet another way, the difference in thickness from the first end 30' to the second end 32' may range from about 2 to 60 μm. Of course, depending on the desired dimensions of the final separator layer 34, other non-uniform film thicknesses may be produced. Such a non-uniform thickness may be produced by extruding the film through an extrusion die having a non-uniform opening.

Other techniques may be used to produce a polymer-containing film having a non-uniform thickness. For example, film 34' may be deposited onto substrate 50 via a spray process similar to painting, where the film is applied thicker in cross-section at first end 30' than at second end 32', for example by metering a greater amount of polymer solution near the first end than near the second end. Other techniques may include a casting process, an injection/roll compaction process, or a slot die coating system with a non-uniform opening. The film thickness may be applied non-uniformly by shifting the angle of a doctor blade or compaction rollers, for example.

Referring again to FIG. 4, process step 44 generally includes selectively densifiying the polymer-containing film to have a non-uniform polymer concentration. In general, this step entails processing the polymer-containing film so that the thickest areas of the film deposited in step 42 are reduced in thickness to increase their corresponding polymer concentrations by the end of step 44. The thinnest areas of the film deposited in step 42 may also be reduced in thickness and have higher polymer concentration by the end of step 44, but the overall reduction in thickness and corresponding increase in polymer concentration is less in the thin areas from step 42, such as second end 32' in FIGS. 5 and 6. In some cases, the thickness profile will be reversed after step 44. For example, first end 30' is thicker than second end 32' at the beginning of step 44, as shown in FIGS. 5 and 6. After step 44, it is possible, and even likely in some embodiments such as that depicted in FIG. 5, that first end 30' is thinner than second end 32', for reasons that will be described in more detail below.

In an exemplary embodiment, the polymer concentration is uniform throughout the film 34' at the beginning of step 44, ranging from 5-40% polymer by weight and preferably about 20% polymer by weight. At the completion of step 44, the polymer concentration at first end 30' may range from about 5-40% polymer by weight and preferably about 25% polymer by weight, while the polymer concentration at second end 32' may range from about 15-60% and preferably about 40% polymer by weight. These concentration changes across the width of film 34' may vary depending on several factors, including the desired change in thickness prior to step 46, discussed in more detail below.

In one embodiment, illustrated in FIG. 5, the film 34' is selectively densified using a preferential evaporation process. In FIG. 5, the upward pointing arrows represent solvent evaporating from film 34' with the length of each arrow generally corresponding to exemplary evaporation rates in the corresponding region of the film, though the arrows are not necessarily to scale. The exemplary evaporation process is designed to non-uniformly remove solvent from the polymer-containing film, particularly where the film is a polymer solution as preferably produced in process step 42. More specifically, a greater amount of solvent is removed from thicker regions of film 34', such as first end 30', than from thinner regions, such as second end 32', through solvent evaporation. One effect of the evaporation in any area of the film is to effectively increase the concentration of the polymer in the polymer solution, and thereby in the polymer-containing film in the corresponding area. Another effect of the evaporation is to decrease the thickness of the film. Preferentially evaporating a greater amount of solvent from the polymer film in the thicker areas of the film than in the thinner areas of the film thus has the effect of increasing the polymer concentration in the areas of greater solvent evaporation, with a corresponding reduction in film thickness. Stated another way, the thicker areas of film 34' become more densified, which, as used herein, indicates a higher polymer content per unit mass of film.

The rate of evaporation of polymer solvent from exemplary film 34' may be affected by several variables, such as temperature, pressure (of the surrounding atmosphere), overhead fluid flow rate, solvent vapor pressure, polymer concentration, or other factors. By controlling and varying one or more of these variables across the width of the film 34', evaporation rates across the width of the film can be controlled to bring the film 34' to a non-uniform polymer concentration and a corresponding thickness distribution across its width. For example, the film 34' may be placed in a chamber 52 having a variable overhead space 54. The chamber 52 may be a closed chamber that can house individual films 34', or it may be a chamber through which a continuous film 34' can pass, supported by a moving substrate 50 such as a conveyor. Variable space 54 is provided in chamber 52 as a space in which one or more of the above variables affecting evaporation rate can be controlled. Variable space 54 may include a first and second end 56, 58 corresponding to first and second ends 30', 32' of film 34' and may be located above the film 34' and substrate carrier 50. In one embodiment, variable space 54 may have a non-uniform temperature profile such that first end 56 is controlled to have a higher temperature than second end 58, with a controlled temperature gradient between the two ends 56, 58. Separately controlled heaters or other types of variable heat sources may be used along the width of the variable space to provide the non-uniform temperature profile. Suitable temperatures widely vary, depending on the type of solvent in the film and other factors. In one embodiment, the temperature gradient is provided beneath the film 34' to avoid the formation of a skin layer on top of the film. This type of temperature control, while from beneath the film, still results in a variable overhead space where vapor pressures above the film are varied by the temperature profile provided beneath the film.

In another embodiment, variable space 54 may provide a non-uniform pressure profile such that a lower pressure region is provided at first end 56 than at second end 58, with a gradient provided between the two ends. For example, a series of separately controlled vacuum units or a vacuum nozzle having a non-uniform orifice may be used along the width of the variable space to provide the non-uniform pressure profile, in which the various pressure regions may be localized near the film 34' across its width. In another exemplary embodiment, the flow rate of an ambient fluid, such as air, flowing through space 54 may be selectively controlled. For instance, the ambient fluid may generally travel in the extrusion direction over the film 34' such that the flow rate is higher at the first end 56 of the space than at the second end 58 of the space 54, with a gradient in flow rate between the ends. This non-uniform ambient fluid flow rate may be provided, for example, by a series of fans or blowers arranged to provide the desired flow profile over film 34'. Other techniques of controlling ambient fluid flow rate are possible, and ambient fluids other than air may be utilized.

One or more of these or other exemplary variable space configurations may also be combined. For example, a non-uniform ambient fluid flow rate may be provided in the variable space 54 where the temperature of the ambient fluid is also non-uniform from one end of the space to the other. For instance, warmer, faster moving air may be forced to flow over the first end 30' of film 34', while cooler, slower air may be forced to flow over the second end 32', with gradients of each of the flow rate and the temperature between the two ends. In other embodiments, one variable such as temperature may be controlled from beneath the film 34' and substrate 50, and/or another variable such as pressure may be controlled from above the film 34'. It is also possible to entirely eliminate the chamber in some applications, providing non-uniform temperature, pressure, and/or flow rate profiles over film 34' using the associate equipment outside of a chamber environment. But chamber 50 may provide the additional advantage of controlling other process variables besides those being used to preferentially evaporate solvent from the polymer-containing film. In all of the above exemplary embodiments of variable space 54, evaporation is favored at the thicker portions of the film, thus densifiying the film such that a non-uniform polymer concentration across the width of the film is obtained, along with a different non-uniform thickness profile than that at the beginning of step 44. As indicated at the bottom of FIG. 5, the resulting thickness of film 34' is non-uniform, but different than at the beginning of step 44. More particularly, first end 30' is thinner that second end 32' after the preferential evaporation process.

This type of thickness profile may be desirable due to the nature of the subsequent solvent exchange process. A typical solvent exchange process will cause an overall shrinkage of the film, including a reduction in its thickness. The amount of shrinkage, and thus the amount of reduction in thickness, is a function of polymer concentration in the film, among other variables. Because exemplary process 40 introduces a non-uniform polymer concentration across the width of film 34' in step 44, the shrinkage across the width of the film during solvent exchange will be non-uniform as well. In particular, higher polymer concentration generally results in less shrinkage while lower polymer concentration generally results in more shrinkage. Therefore, for step 46 to result in a film having a uniform thickness across its width, the higher polymer concentration portion of film 34', in this case second end 32', should be thinner than the lower polymer concentration portion, such as first end 30'.

In another exemplary embodiment of step 44, illustrated in FIG. 6, the film 34' is selectively densified by mechanical working, for example by employing a calendaring process in which the polymer-containing film and/or the substrate may be driven through a series of rollers designed to impart a uniform thickness to materials in sheet or film form by squeezing the material between the rollers. A typical calendaring process may employ multiple sets of rollers that are arranged so that successive roller pairs include rollers that are spaced closer together than each previous pair, gradually thinning the material as it makes its way through all of the roller sets. However, in order for a polymer-containing film that is a polymer solution—particularly a relatively dilute polymer solution—to have sufficient integrity to be mechanically worked, the film may be subjected to a pre-conditioning process prior to mechanical working.

In an exemplary pre-conditioning process, the polymer-containing film is subjected to an environment including a non-solvent, as previously defined in the summary description of a solvent exchange process. Preferred non-solvents include water, various alcohols, and blends thereof, though any non-solvent that is miscible with the polymer solvent and will not dissolve the polymer may be used. As a pre-conditioner, the non-solvent is preferably in vapor form, limiting the uptake of the non-solvent by the polymer solution film so that complete solvent exchange does not occur prematurely. The pre-conditioning process partially solidifies the polymer solution into a gel-like film, though it does not change the relative dimensions of the film 34'; i.e., the polymer-containing film having a non-uniform thickness retains its non-uniform thickness during pre-conditioning. In a non-limiting example of a preconditioning process, film 34' may enter a chamber 60 that includes a space 62 including a non-solvent, sometimes mixed with polymer solvent, in vapor form. Chamber 60 may be a closed chamber or a flow-through chamber that allows film 34' to move through the space 62, carried by substrate 50. A preferred non-solvent may be water, and the relative amount of water vapor in space 62 is measured as relative humidity. In one embodiment, the relative humidity in space 62 is maintained at or above 50%, and the exposure time ranges from about 1 second to about 15 minutes. In other embodiments, the relative humidity is maintained at about 75% or up to about 95%. The combination of humidity and exposure time should be selected so that the film is sufficiently solid to undergo mechanical working. During the conversion of the polymer solution from a liquid-like to a gel-like state, porosity of the film may be initiated in the form of uniformly distributed pore sites and/or pores throughout the film, though by terminating the pre-conditioning process when the film obtains sufficient solidification for mechanical working, any pores formed may be generally too small to be useful in a battery separator.

After the pre-conditioning process, mechanical working of the film 34' may proceed. Film 34', and optionally substrate 50, may be driven through one or more pairs of rollers 64 to bring film 34' to a uniform thickness across its width. Similar to the preferential evaporation process previously described, film 34' is densified to a greater extent at first end 30'—the thicker end—than at second end 32'. Preferentially compressing film 34' in this manner thus both evens out the thickness of the film across its width, and increases the polymer concentration or film density in the areas of greater compression (the formerly thicker areas). As with the preferential evaporation process, the film 34' is densified such that a non-uniform polymer concentration is obtained across the width of the film. In this case, however, a uniform film thickness is also obtained and is preferable. Because of the pre-conditioning of the film to bring it to a gel-like form, the shrinkage in the subsequent solvent exchange step is more uniform than with the non-pre-conditioned film as described in conjunction with FIG. 5. Other known mechanical working techniques may also be utilized to densify film 34'.

Step 46 generally includes inducing porosity in the film and is preferably accomplished via a solvent exchange process, also known as a phase inversion process. Simply stated, the solvent exchange process includes immersing the polymer-containing film in a bath containing a non-solvent, such as water or alcohol, as non-limiting examples. The bath may also contain a mixture of polymer solvent and non-solvent which, among other things, may affect the kinetics of the solvent exchange process. Typically, the film, such as exemplary film 34', is immersed in a coagulation bath including the selected non-solvent. As previously noted, the non-solvent should be miscible with the polymer solvent for the exchange process to work effectively. Individual films on their respective substrates may be placed into the coagulation bath, or the bath may be arranged such that a continuously moving film and substrate can make its way through the bath. In the solvent exchange process, the polymer solvent, miscible with the bath of non-solvent in which it is immersed, begins to leave the film 34' to mix with the non-solvent bath, being continuously replaced in the film 34' with non-solvent. As this exchange of polymer solvent for non-solvent transpires within the film, the solvent within the film changes in composition from pure polymer solvent to a mixture of polymer solvent and non-solvent, with the percentage of non-solvent continuously increasing. Thus, the solubility of the polymer is negatively affected, and the polymer begins to precipitate out of solution when the non-solvent becomes a sufficiently high percentage of the solvent within the film 34'. Eventually, the non-solvent substantially replaces all of the polymer solvent within the film and a porous film of the polymer, saturated in non-solvent, results.

While solvent exchange processes such as this may typically be used to form porous films from polymer solution films, utilizing such a process with selectively densified films 34' produced via the above-described processes—more particularly, films having a non-uniform polymer concentration across their width—is previously unknown. The result of using the described solvent exchange process on such films 34' is an obtainable separator layer 34 (such as that for use in the battery 10 of FIG. 1) including terminal end 30 and opposite end 32 and having a uniform thickness and a variable porosity between its ends. More particularly, with reference to exemplary separator layer 34, terminal end 30 has a lower porosity than opposite end 32. This result is achieved because first end 30' has a higher polymer concentration than second end 32' when entering the porosity-inducing solvent exchange process. In other words, lower polymer concentration in a given region of the film entering the coagulation bath results in higher porosity in that region when it leaves the bath, and vice versa. As previously described, higher porosity may also indicate larger average pore size in the higher porosity region. Separator layer 34 may be obtained from the post-solvent exchange film by cutting, trimming, or otherwise obtaining the separator layer such that it is complimentary in shape to the electrodes of the electrochemical cell in which it will be used. For example, in a continuous process where the film 34' is continuous from its deposition on the substrate through the coagulation bath, the resulting continuous film having uniform thickness and variable porosity across its width may be cut across its width into individual separator layers with each cut spaced from one another corresponding to the desired width of the separator layer. Alternatively, a longer section of film can be cut from the continuous film corresponding to multiple electrode widths to wrap around consecutive electrodes to provide separator layers between pairs of electrodes with one continuous piece of separator material. The edge to edge width of the extrusion may also be trimmed to the desired length (terminal end to opposite end) so that the shape of separator layer 34 is complimentary in shape with the battery electrodes. Alternatively, the film may be cut to size prior to the solvent exchange process, taking into account any known shrinkage or swelling rates for the particular polymer-solvent-non-solvent system.

In an exemplary embodiment of separator 34 produced according to the above-described methods, the resulting porosity near the terminal end 30 of separator layer 34 may range from 20-88% and the resulting porosity near the opposite end 32 may range from 22-90%. More preferably, the porosity near the terminal end 30 ranges from 40-78% and the porosity near the opposite end 32 ranges from 42-80%. In one embodiment, separator layer 34 has a gradually increasing porosity from the terminal end 30 to the opposite end 32, where the porosity near the terminal end is at least 20% and the porosity near the opposite end is at least 22%. In yet another embodiment, the difference between the porosity near the terminal end and the porosity near the opposite end is at least 2% porosity. Preferred pore sizes are less than 1 μm at both ends of the resulting separator layer, but may be larger at the opposite end 32 than they are at terminal end 30, in one embodiment being at least 5% larger. In another embodiment, average pore sizes near the terminal end 30 are less than 1 μm, and average pores sizes near the opposite end 32 are greater than 1 μm. In yet another embodiment, separator layer 34 has a gradually increasing pore size from the terminal end 30 to the opposite end 32, where the average pore size near the terminal end is less than 1 μm and the average pore size near the opposite end is at least 5% greater than the pore size at the terminal end. Of course, process variables may be adjusted to obtain pore sizes and porosities outside of these ranges, depending on the particular application.

Separator layers 34 having variable porosity as may be produced by this or other exemplary processes can help alleviate some of the potentially undesirable effects described earlier that may be caused by non-uniform current densities within electrochemical battery cells. Such separator layers having variable porosity can help alleviate these potentially undesirable effects by helping to eliminate the actual cause of the effects; namely, the non-uniform current density along a given electrode and within its corresponding battery cell or cells. For example, separators 18 in FIG. 1 can be constructed to comprise separator layers 34, made according to the exemplary processes described above. Such separators 18 may be disposed between the electrodes 14, 16 of the exemplary battery 10. Because the terminal end 30 of each separator has a lower porosity than its corresponding opposite end 32, the resulting current distribution within the cells while the battery 10 is in operation is more uniform. This more uniform current distribution is due to the higher porosity portion of the separator 18 near the bottom of battery 10 allowing a higher level of ionic transport between electrodes, while the lower porosity portion of the separator 18 near the top of the battery 10 is more restrictive of ion transport between electrodes, thus evening out the tendency for the top portions of the electrodes to experience higher current density due to their proximity to the common terminals 22, 26. Uniformly distributing the current density within the battery cells thus alleviates the uneven temperature distributions within battery cells and the uneven or preferential use and cycling of certain portions of the electrodes over others.

Of course, the above-described processes are only exemplary and may include additional process steps, omit certain steps, and/or include modified steps, depending on the desired final separator layer configuration and structure. For example, in selective densifiying embodiments that include mechanical working, the working may be performed in the coagulation bath, usually near the beginning of the bath in a continuous process while the film is in a gel-like state and before it is fully solidified or precipitated. In such an embodiment, it may be possible to eliminate the pre-conditioning process. In other embodiments, the film may be partially worked prior to entering the coagulation bath and further worked in the bath. In another embodiment, the pre-conditioning step may be used in combination with preferential evaporation, either before or after the evaporation process or both before and after. For example, pre-conditioning prior to the preferential evaporation step may help to provide more controlled (slower) evaporation, while pre-conditioning after the evaporation step may help to control the resulting pore size, structure or morphology during the solvent exchange process. Additionally, multiple densifiying techniques may be combined, such as in processes including preferential evaporation and mechanical working as selective densification techniques. In one embodiment, an additional process step that may include stretching the resulting film in one or more directions may be added. Though not usually necessary following solvent exchange processes, stretching the film can help to increase pore size and/or porosity for certain applications.

It is also noteworthy that the above processes, terminology, and the order of the process steps may be described differently but remain within the scope of the teachings herein presented. For example, another way to describe the pre-conditioning process previously described is to include it as a part of the solvent exchange process, because the pre-conditioning process includes limited solvent exchange. For example, pre-conditioning followed by mechanical working followed by solvent exchange may be viewed as a single solvent exchange process interrupted by mechanical working or as a solvent exchange process in which mechanical working of the film is included.

In additional variations, the polymer film 34' produced in step 42 of process 40 may have a non-uniform thickness other than that indicated in FIGS. 5 and 6. For example, both ends of film 34' may include thicker or thinner portions than a middle portion of the film. Corresponding multiple thicker portions, for example, may be selectively densified using the techniques presented above to form multiple regions of lower porosity than in the remainder of the resulting separator layer. Thus, the porosity within a separator layer, particularly along its length from its terminal end to its opposite end, can be selectively controlled.

Such polymer-based films having controllable, variable porosity may additionally find other applications in the battery art, and are certainly not limited to use as battery separator layers, as controlled porosity may be useful for other battery applications besides controlling ionic transport between electrodes. Controllable, variable porosity films may even find useful applications outside the battery art, such as in fuel cells or in fluid filtration applications, for example.

While preferred embodiments of the invention have been described as illustrations, these illustrations are not intended to limit the scope of the invention.

The invention claimed is:

1. A method of making a thin polymeric separator having an open porous structure that, when placed between and in facial contact with a positive electrode and a negative electrode in an electrochemical cell and filled with an electrolyte solution, permits the flow of ions in the cell from one electrode through the separator to the other electrode, each electrode having a shape in plan view and an electrical contact, the method comprising:
  a) forming a polymer-containing film having a non-uniform thickness across its width, the film comprising a polymer and a polymer solvent in which the polymer is soluble;
  b) selectively densifying the polymer-containing film by changing the thickness of the film by different amounts across its width so that the polymer-containing film has a non-uniform polymer concentration across its width;
  c) subjecting the film to a solvent exchange process in which the polymer solvent of the film is at least partially replaced with a non-solvent in which the polymer is not soluble, wherein the polymer of the polymer-containing film is precipitated to form a porous structure in the film, the porous structure comprising the precipitated polymer and having a porosity that varies across the width of the film; and
  d) obtaining the thin polymeric separator from the film in a shape complementary to the shapes of the positive and negative electrodes such that the porous structure includes pores that are sized and can be arranged in the cell to permit higher ionic current flow through the separator at locations removed from the electrical contacts on the electrodes so as to more uniformly distribute ionic current flow through the separator over the whole facial area of the separator.

2. The method as recited in claim 1 in which: step a) includes extruding a continuous polymer-containing film in an extrusion direction, the width of the continuous film oriented transverse to the extrusion direction, where a cross-section across the width of the continuous film includes a first end corresponding to one edge of the continuous film and a second end corresponding to an opposite edge of the continuous film, the continuous film having a thickness that gradually decreases from the first end to the second end of the cross-section; and the polymer concentration is higher at the first end that at the second end after step b).

3. The method as recited in claim 1 in which the polymer is present in the film in an amount of 40% or less by weight in step a).

4. The method as recited in claim 1 in which step b) includes preferential evaporation of the polymer solvent from the polymer-containing film, evaporation of the polymer solvent being favored in thicker areas of the film so that the areas of the film that are thicker before step b) have a higher polymer concentration than other areas of the film after step b).

5. The method as recited in claim 1 in which step b) includes the steps of partially solidifying the polymer-containing film to a gel-like state and mechanically working the polymer-containing film to a uniform thickness.

6. The method as recited in claim 5 in which the step of partially solidifying the polymer-containing film includes pre-conditioning the film with a vapor that comprises a non-solvent.

7. The method as recited in claim 5 in which step c) includes immersing the film in a coagulation bath comprising a non-solvent and the step of mechanical working occurs in the coagulation bath before the solvent exchange is complete.

8. The method as recited in claim 1 in which the polymer comprises a polyimide or an aromatic polymer and further comprises a sulfur atom or a nitrogen atom in its repeating unit.

9. The method as recited in claim 1 in which the polymer comprises an aromatic polyimide.

10. The method as recited in claim 1 in which the polymer solvent includes at least one of dimethyl sulfoxide, dimethylformamide, N-methylpyrrolidone, or acetonitrile.

11. The method as recited in claim 1 in which step a) includes depositing the polymer-containing film onto a moving substrate so that steps b) and c) occur while the film is on the moving substrate.

* * * * *